US012802257B2

(12) United States Patent
Liu et al.

(10) Patent No.: US 12,802,257 B2

(45) Date of Patent: Nov. 17, 2026

(54) METHODS AND SYSTEMS FOR PERFORMING GAZE ESTIMATION WITH META PROMPTING

(71) Applicant: HUAWEI TECHNOLOGIES CO., LTD., Shenzhen (CN)

(72) Inventors: Huan Liu, North York (CA); Zhenhao Li, Unionville (CA); Mohammad Hassanpour, North York (CA); Chu Yan Qi, Kitchener (CA); Yuanhao Yu, Markham (CA); Yang Wang, Pierrefonds (CA); Jin Tang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 18/428,221

(22) Filed: Jan. 31, 2024

(65) Prior Publication Data

US 2025/0245848 A1 Jul. 31, 2025

(51) Int. Cl.
*G06T 7/70* (2017.01)
*G06T 11/00* (2026.01)

(52) U.S. Cl.
CPC ................ *G06T 7/70* (2017.01); *G06T 11/00* (2013.01); *G06T 2207/20081* (2013.01); *G06T 2207/20084* (2013.01); *G06T 2207/30196* (2013.01)

(58) Field of Classification Search
CPC . G06T 7/70; G06T 11/00; G06T 2207/20081; G06T 2207/20084; G06T 2207/30196; G06T 7/73; G06T 2207/30201
USPC .......................................................... 382/157
See application file for complete search history.

(56) References Cited

U.S. PATENT DOCUMENTS

2019/0303723 A1* 10/2019 Linden ...................... G06T 7/20
2021/0150757 A1* 5/2021 Mustikovela ........ G06V 10/242
2023/0274531 A1* 8/2023 Zhu ....................... G06V 20/70
382/128

(Continued)

OTHER PUBLICATIONS

Finn et al., "Model-agnostic meta-learning for fast adaptation of deep networks", Proceedings of the 34th International Conference on Machine Learning, PMLR, Jul. 18, 2017, Sidney, Australia.

(Continued)

*Primary Examiner* — Charlotte M Baker
*Assistant Examiner* — Dustin Bilodeau
(74) *Attorney, Agent, or Firm* — BCF LLP

(57) ABSTRACT

Methods and systems that train a gaze estimation model are provided. The methods and systems generating a mirror image from a given image, generating, by a neural network implementing the model, a first gaze prediction based the given image and a mirror gaze prediction based on the mirror image, generating a symmetry loss value based on a comparison between the first gaze prediction and the mirror gaze prediction, generating, by the neural network, a reconstructed image based on at least one of the given image and the mirror image, generating a reconstruction loss value based on a comparison between the reconstructed image and the at least one of the given image and the mirror image, and updating at least some parameters of the neural network based on a combination of the symmetry loss value and the reconstruction loss value.

10 Claims, 5 Drawing Sheets

(56) References Cited

U.S. PATENT DOCUMENTS

2025/0022100 A1* 1/2025 Wu ........................... G06T 5/50

OTHER PUBLICATIONS

Kellnhofer et al., "Gaze360: Physically unconstrained gaze estimation in the wild", Proceedings of the IEEE/CVF International Conference on Computer Vision, Oct. 22, 2019.
Zhang et al., "ETH-XGaze: A large scale dataset for gaze estimation under extreme head pose and gaze variation", ECCV, Jul. 31, 2020.
Jia et al., "Visual prompt tuning", European Conference on Computer Vision, Cham: Springer Nature Switzerland, Jul. 20, 2022.
Bao et al., "Generalizing gaze estimation with rotation consistency", In Proceedings of the IEEE/CVF Conference on Computer Vision and Pattern Recognition, pp. 4207-4216, 2022.
Liu et al., "Self-supervised generalisation with meta auxiliary learning", 33rd Conference on Neural Informtion Processing Systems (NeurIPS), 2019, Vancouver, Canada.

* cited by examiner

METHODS AND SYSTEMS FOR PERFORMING GAZE ESTIMATION WITH META PROMPTING

FIELD

The present technology relates generally to machine learning, and more specifically, to methods and systems for performing gaze estimation with meta prompting.

BACKGROUND

Gaze, which generally refers to the direction of an individual's visual focus, is a crucial indicator of human attention. Gaze estimation is performed by computer-implemented systems for predicting the direction of an individual's gaze based on a position and/or an orientation of their eyes and/or head from image data. Gaze estimation may be used in a variety of applications such as healthcare, gaming, and human-computer interaction, for example.

Recent years have witnessed tremendous success of utilizing deep learning in addressing the gaze estimation problem. However, most of deep-learning based methods essentially learn a mapping on the training data in a supervised manner. One example of such a supervised learning method is presented in the paper Zhang, Xucong, et al. "Eth-xgaze: A large scale dataset for gaze estimation under extreme head pose and gaze variation." ECCV 2020. This paper discloses a gaze estimation dataset called ETH-XGaze, consisting of over one million high-resolution images of varying gaze under extreme head poses. A custom hardware setup is used including 18 digital SLR cameras and adjustable illumination conditions, and a calibrated system to record ground truth gaze targets. The dataset supports robustness of gaze estimation methods across different head poses and gaze angles in supervised learning techniques. These methods can suffer from performance degradation when tested in real-world scenarios with distribution shift. In addition, collecting labeled data in the real world is extremely difficult, making it challenging to fine-tune. These issues raise concerns about the practical value of purely supervised methods.

Another recent attempt has focused on gaze estimation in the unsupervised domain adaptation (UDA) setting in the paper Kellnhofer, Petr, et al. "Gaze360: Physically unconstrained gaze estimation in the wild". This paper introduces Gaze360, a large-scale gaze tracking dataset and method for 3D gaze estimation in unconstrained environments. The dataset features 238 subjects in various indoor and outdoor settings, encompassing a broad range of head poses and distances. This paper also details a 3D gaze model that incorporates temporal information and directly estimates gaze uncertainty. The model's effectiveness is demonstrated through ablation studies, cross-dataset evaluations, and a real-world application scenario in a supermarket, showcasing its potential for understanding customer attention. In the Gaze360 paper, a self-supervised method is described for adapting the gaze estimation model to new, unseen domains. This approach involves fine-tuning the model using a mix of labeled images from the Gaze360 dataset and unlabeled images from the new domain. A discriminator is introduced to identify the source domain of the image features, and its loss is added to the original supervised loss for images with ground truth. Additionally, a loss function exploiting the left-right symmetry of gaze estimation is used to improve model output consistency on unlabeled data. This method aims to enhance the model's performance in new and diverse real-world applications.

Pure supervised methods are able to achieve high accuracy on the training dataset, but these methods suffer from performance degradation when tested in real-world scenarios with distribution shift. In addition, collecting labeled data in the real world is extremely difficult, making it challenging to fine-tune. Supervised personalization methods usually require either calibration or ground truth gaze labels, neglecting the difficulty to obtain such labels in practical use, which may significantly limit their practical deployment.

Considering the discussions on the limitations of existing gaze estimation solutions, the present disclosure aims to provide a domain adaptive gaze estimation method that is able to be personalized at the test time given users' specific data, is free of acquiring labeled data from users, and is fast in adaptation speed. It is a further objective of the present disclosure to ensure that the model parameters are updated computationally efficiently in the personalization adaptation stage. Other objects and advantages obtained by the disclosed methods and systems will become apparent from the following description.

SUMMARY

Developers of the present technology have devised methods and devices for overcoming at least some drawbacks present in prior art solutions.

Developers of the present technology have realized that conventional UDA methods assume the availability of source data, which may not be available in real-world applications due to privacy concerns.

In the present technology, a new variant of UDA is addressed, i.e., unsupervised personalization. With the widespread use of portable devices such as smartphones, laptops and tablets, personalized experiences have become increasingly necessary. Personalizing gaze estimation based on the user's unique characteristics is essential for enhancing the accuracy of the model's predictions. Unfortunately, current personalized gaze estimation methods usually require either calibration or ground truth gaze labels, which may significantly limit their practical deployment.

An efficient and effective method is disclosed herein for personalized gaze estimation by tuning additional person-dependent parameters without labels. Specifically, the personalization tuning of a pre-trained model is made by updating a small group of parameters solely, namely the "prompt", while freezing the backbone of the entire network during personalization. The prompt is person-specific and memory-saving, with a cost of less than 1% of a ResNet-based model. Developers of the present technology provide a meta-initialized prompt for better generalizing to a specific person's data and applying prompts to more convolutional layers instead of the input image only.

The prompt is updated without labels to obtain improved performance on a particular user.

The adaptation process is first decoupled into two problems, i.e., image distribution shift and individual eye structure differences. Image distribution shift occurs due to variations in environment, illumination and camera specifications. Individual eye structure can influence the angle of kappa, which is the angle between the visual axis and the actual gaze direction. To address these two issues, image reconstruction and left-right symmetry of gaze are used, respectively.

In order to guarantee that the gaze estimation error on a particular person can be automatically minimized by minimizing two unsupervised losses, a meta-learning approach is described. A goal of meta-learning is to learn an initialization of the prompt so that its updates towards lower unsupervised losses are equivalent to updates towards lower gaze estimation error.

In a first aspect, a method is provided. The method comprises: generating a mirror image from a given image, the given image obtained from a database of training images; generating, by a neural network, a first gaze prediction based the given image and a mirror gaze prediction based on the mirror image; generating a symmetry loss value based on a comparison between the first gaze prediction and the mirror gaze prediction; generating, by the neural network, a reconstructed image based on at least one of the given image and the mirror image; generating a reconstruction loss value based on a comparison between the reconstructed image and the at least one of the given image and the mirror image; updating at least some parameters of the neural network based on a combination of the symmetry loss value and the reconstruction loss value; using the updated neural network to provide a further gaze prediction based on a further image, the further image obtained from a user device; and outputting the further gaze prediction to an application utilizing the further gaze prediction.

In embodiments, the neural network comprises a convolutional neural network.

In embodiments, the neural network comprises a backbone providing backbone output to a decoder for generating reconstructed images and to a gaze estimation layer for providing gaze predictions.

In embodiments, updating at least some parameters of the neural network comprises updating a meta prompt that determines characteristics of padding applied to the given image and the mirror image.

In embodiments, the neural network is a convolutional neural network comprising m layers and the updating at least some parameters of the neural network comprises updating a meta prompt that determines characteristics of padding applied to a first n output feature maps from a preceding layer of the m layers of the convolution neural network, wherein n is greater than 2 and less than m.

In embodiments, in updating at least some parameters of the neural network comprises freezing pre-trained parameters of the backbone, the decoder and the gaze estimation layer.

In a second aspect, a system is provided comprising: at least one processor; and a memory storing computer program instructions executable by the at least one processor such that the system is configured to: generate a mirror image from a given image, the given image obtained from a database of training images; generate, by a neural network, a first gaze prediction based the given image and a mirror gaze prediction based on the mirror image; generate the symmetry loss value based on a comparison between the first gaze prediction and the mirror gaze prediction; generate, by the neural network, a reconstructed image based on at least one of the given image and the mirror image; generate a reconstruction loss value based on a comparison between the reconstructed image and the at least one of the given image and the mirror image; update at least some parameters of the neural network based on a combination of the symmetry loss value and the reconstruction loss value; use the updated neural network to provide a further gaze prediction based on a further image, the further image obtained from a user device; and output the further gaze prediction to an application that is executable by the at least one processor and that utilizes the further gaze prediction.

In embodiments, the neural network comprises a convolutional neural network.

In embodiments, the neural network comprises a backbone providing backbone output to a decoder for generating reconstructed images and to a gaze estimation layer for providing gaze predictions.

In embodiments, updating at least some parameters of the neural network comprises updating a meta prompt that determines characteristics of padding applied to the given image and the mirror image.

In embodiments, the neural network is a convolutional neural network comprising m layers and the updating at least some parameters of the neural network comprises updating a meta prompt that determines characteristics of padding applied to a first n output feature maps from a preceding layer of the m layers of the convolution neural network, wherein n is greater than 2 and less than m.

In embodiments, updating at least some parameters of the neural network comprises freezing pre-trained parameters of the backbone, the decoder and the gaze estimation layer.

In a further aspect, a computer implemented method of training a model for gaze estimation is provided, the method comprising: providing a source dataset of labelled images; providing a personalization dataset of unlabeled images for a given user; Providing the model in the form of a convolutional neural network comprising m layers; pre-training the model by minimizing a first optimization function comprising a supervised loss function comparing a gaze label for each labelled image of the source dataset and a gaze prediction by the convolutional neural network for each labelled image; and adapting the model to be personalized to the given user by: updating a meta-prompt that determines padding to be applied to at least a first n layers of the convolutional neural network by minimizing a second optimization function comprising an unsupervised loss function based on the personalization dataset.

In embodiments, pre-training the model comprises generating a mirror image for each of the labelled images, the first optimization function comprises a symmetry loss function and a reconstruction loss function, and pre-training the model comprises minimizing the symmetry loss function based on gaze prediction error for the mirror image and a paired labelled image and minimizing the reconstruction loss function based on a comparison of the reconstruction of at least one of the paired labelled image and the mirror image and the at least one of the paired labelled image and the mirror image.

In embodiments, the method comprises pre-training the meta prompt based on a batch of the source dataset and based on the supervised loss function, the symmetry loss function and the reconstruction loss function.

In embodiments, the convolution neural network comprises a backbone that outputs at least one feature map to a decoder and to a gaze estimation layer, wherein the decoder provides the reconstruction of at least one of the paired labelled image and the mirror image and the gaze estimation layer provides gaze predictions.

In embodiments, pre-training the model updates parameters of the backbone, the decoder and the gaze estimation layers and after pre-training the updated parameters of the backbone, the decoder and the gaze estimation layer are frozen during adapting the model to be personalized to the given user.

In embodiments, updating the meta-prompt comprises generating a mirror image for each of the unlabeled images, the unsupervised loss function of the second optimization function comprises a symmetry loss function and a reconstruction loss function, and updating the meta-prompt comprises minimizing the symmetry loss function based on gaze prediction error for the mirror image and a paired unlabelled image and minimizing the reconstruction loss function based on a comparison of the reconstruction of at least one of the paired unlabelled image and the mirror image and the at least one of the paired labelled image and the mirror image.

In embodiments, n is greater than 5 and less than m.

In embodiments, the method comprises using the updated model in an application by outputting a gaze prediction from the updated model based on an image of the given user, wherein the application consumes the gaze prediction in at least one computer implemented process.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
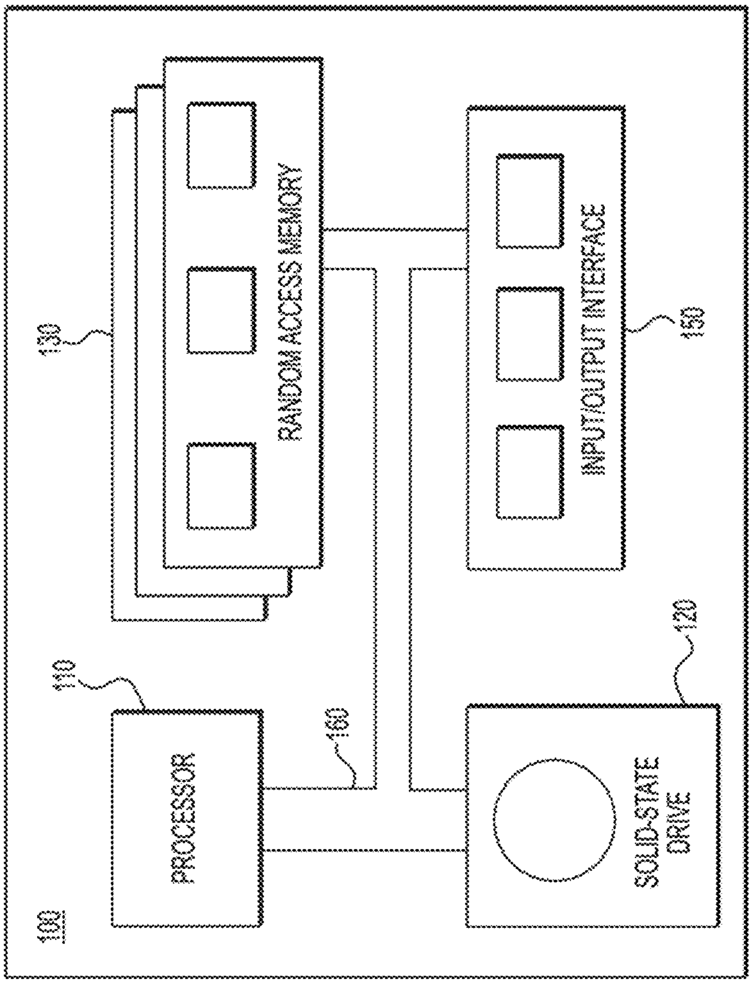
FIG. 1 illustrates an example of a computing device that may be used to implement any of the methods described herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (Saas). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

Figure 2:
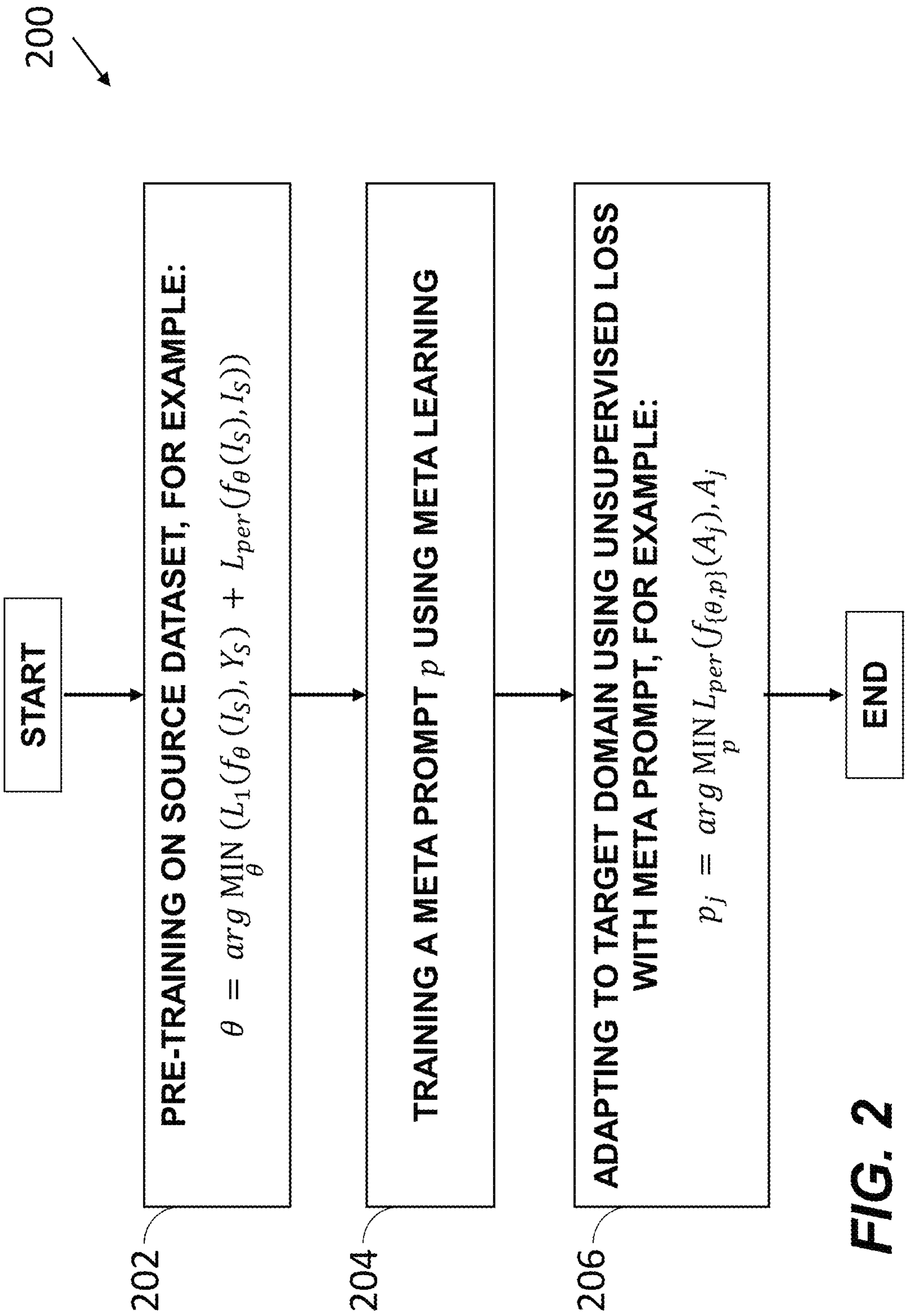
FIG. 2 is a scheme-block illustration of a method executed by a processor of the computing device of FIG. 1, in accordance with at least some non-limiting embodiments of the present technology.

Referring to FIG. 2, an overall method of training a model $f_\theta$ for gaze estimation is disclosed. The method of FIG. 2 is executed by the processor 110 executing machine instructions. The model $f_\theta$ may be stored in computer memory such as the solid-state drive 120. The method includes pre-training of the model $f_\theta$ on a source dataset in step 202. The model is pre-trained using the source dataset S. The objective is to minimize a loss function that combines a supervised loss $L_1$ with an unsupervised loss $L_{un}$. The supervised loss ensures the model's predictions match the labeled data, while the unsupervised loss adjusts the model to capture individual nuances within the source data.

The source dataset for training the gaze estimation model includes a collection of visual data, including images and/or videos, that captures a range of human subjects with various gaze directions. This dataset is annotated with labels indicating the direction of each subject's gaze, such as the 3D coordinates of where each subject is looking, and possibly the head pose as well. The content of the dataset may include a diversity of subjects in terms of age, gender, and ethnicity, and a variety of environmental conditions to ensure robustness, such as different lighting scenarios and backgrounds. The dataset might also encompass a range of distances from the camera, different facial expressions, and occlusions, to provide a comprehensive set of training examples for the gaze estimation model.

Given a source dataset $$S = \{(x_i^s, y_i^s) \mid x_i^s \in I_S, y_i^s \in Y_S\}_{i=1}^{N_s} \quad \text{(equation 1)}$$

where $$x_i^s \text{ and } y_i^s$$

are respectively the image and label from source image set $I_S$, and source label set $Y_S$. Let $$A_j = \{x_i^{a_j} \mid x_i^{a_j} \in I_{T_j}\}_{i=1}^{N_{A_j}} \quad \text{(equation 2)}$$

denote the personalization dataset of j-th person, where $$x_i^{a_j}$$

is the unlabeled image sampled from the target image set of j-th person $I_{T_j}$. The present disclosures provides systems and methods to update the model $f_\theta$ learned on the source dataset S using the personalization dataset $A_j$, so that the resulting personalized model $f_{\theta_j}$ can perform better on the j-th person.

Systems and methods described herein provide for domain adaptive gaze estimation, specifically source-free domain adaptive (SF-UDA) gaze estimation. In one embodiment, pre-training step 202 is based on the following equation:

$$\theta = \arg\min_{\theta}(L_1 f_\theta(I_S), Y_S) + Lper\,(f_\theta(I_S), I_S)\big) \quad \text{(equation 3)}$$

where $L_1$ is the supervised loss and $L_{per}$ denotes unsupervised loss. The pre-training phase of step 202 aims to learn the model $f_\theta$ that can estimate gaze and complete unsupervised tasks, simultaneously.

The pre-training step 202 may include various steps as will be described. As part of the pre-training step, the source dataset S may be prepared into pairs of images and corresponding gaze labels. The images in the source dataset capture a wide range of gaze directions, head poses, and environmental conditions. A suitable neural network architecture is chosen for the model that can handle the complexity of gaze estimation. The neural network may include a convolutional neural network (CNN) for image processing tasks. A specific example described below makes use of ResNet18. A supervised loss function, such as mean squared error or cross-entropy, is selected to measure the accuracy of the model's gaze predictions against the labeled data. Additionally, an unsupervised loss function is defined that encourages the model to learn useful features without needing labels, possibly through consistency regularization or self-supervised learning tasks. The model is trained on the prepared data by minimizing the combined supervised and unsupervised loss functions. Optimization algorithms like stochastic gradient descent (SGD) or Adam may be used. The model may be periodically evaluated on a validation set to monitor its performance and to prevent overfitting. Hyperparameters, such as the learning rate, may be fine-tuned and data augmentation may be performed to improve the model's robustness and generalization. Pre-training step 202 establishes a solid foundation for the model to not only predict gaze directions accurately but also to generalize well to new, unseen data.

In step 202, the model is additionally trained on the dataset using supervised gaze loss and unsupervised loss (a combination of reconstruction loss and left-right symmetry loss). In embodiments as described herein, the unsupervised loss minimizes the divergence between the model's predictions on the original images and on transformed versions of those images, such as flipped or rotated ones, which should yield predictable changes in the estimated gaze direction. This process iteratively adjusts the model's parameters θ to reduce this loss, resulting in a new set of parameters $\theta_j$. The design of the unsupervised loss function $L_{per}$ is crucial because it guides the learning process in the absence of labeled data.

The unsupervised loss function $L_{per}$ (which supports personalized gaze estimation by the model) may be made up of two loss function components, specifically reconstruction loss and left-right symmetry loss. For personalized gaze estimation, the approach is two-fold. The image reconstruction function aims to minimize the difference between input images and their reconstructed counterparts. By fine-tuning the model on person-specific data, it encourages the learning of domain-invariant features, thus improving the model's adaptability to new image distributions that may differ from the training data. The left-right symmetry loss function is based on the importance of angle kappa in gaze geometry. The left-right symmetry loss function leverages the natural left-right symmetry in human gaze. The model is encouraged to estimate that an image and its horizontally flipped version should result in opposite yaw gaze angles. This symmetry-based regularization helps the model fine-tune its gaze estimates for the specific individual during testing.

The image reconstruction loss may be determined using part of the model (typically an autoencoder or similar structure within a larger network) to reconstruct an input image from the source data set from the feature representations learned during the adaptation process. The reconstruction loss is calculated by comparing the pixel-wise difference between the original input image and its reconstructed version, often using a mean squared error (MSE) or similar metric. The model is updated in step 202 to minimize the reconstruction loss, thereby encouraging the model to retain and refine features that are invariant to the domain shift. The left-right symmetry loss may be determined by, for each image in the dataset, generating a horizontally mirrored version. The model predicts the gaze angle for both the original and flipped images. The symmetry loss is determined by how well the model's predictions for the original and flipped images adhere to expected symmetrical properties—specifically, that the yaw angle should be mirrored. The model is fine-tuned to minimize this loss, thereby refining its ability to estimate gaze direction accurately for the individual, even with variations in head orientation.

Accordingly, pre-training step 202 trains the model based on the supervised loss $L_1$ and the unsupervised loss $L_{per}$ according to equation 3 above using the source dataset. The unsupervised loss may be defined according to the following equation, which includes the left-right symmetry and image reconstruction loss functions discussed previously.

$$L_{per}(f_\theta(\cdot),\ \cdot) = L_{rec}(f_\theta(\cdot),\ \cdot) + L_{sym}(f_\theta(\cdot),\ f_\theta(T(\cdot)))(1) \quad \text{(equation 4)}$$

where • is the potential images used for loss calculation, T is horizontal flip operation. $L_{rec}$ is reconstruction loss and $L_{sym}$ is the left-right symmetry loss. Personalization may be conducted as:

$$\theta_j = \arg\min_{\theta} L_{per}(f_\theta(A_j),\ A_j) \quad \text{(equation 5)}$$

where $A_j$ is the personal dataset of j-th user.

In other words, the network θ is updated by minimizing the two unsupervised loss functions, i.e., reconstruction loss and left-right symmetry loss. $\theta_j$ denotes the weights personalized on j-th user's data. In the pre-training step 202, the labelled source data is used and image reconstruction and left-right symmetry operations are performed to allow for initial training of the network using both the supervised and unsupervised loss function components. This process does not require personalization because it focuses on general features that are useful across all individuals in the source dataset. Once the model is trained, the learned features (encodings) can be used by the gaze estimation model to perform its task more effectively. Personalization, which includes image reconstruction and left-right symmetry loss specific to individuals, is performed in subsequent steps of method 200.

Figure 3:
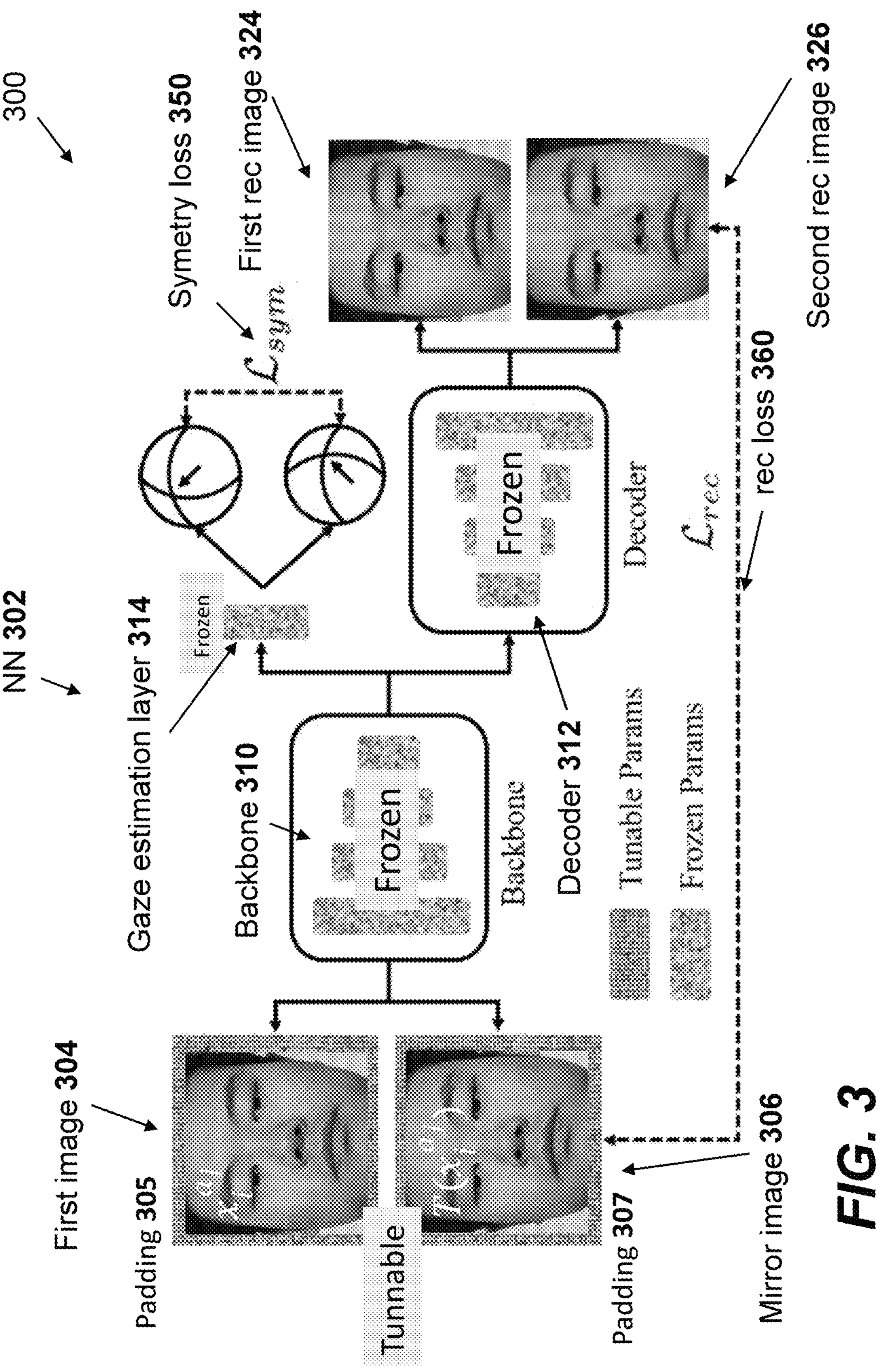
FIG. 3 is a graphic representation of a Neural Network (NN) being trained for test-time personalization for a given user, in accordance with at least some non-limiting embodiments of the present technology.

FIG. 3 provides a graphic representation of a Neural Network (NN) being trained for test-time personalization for a given user in accordance with an embodiment. FIG. 3 shows the neural network 302, which includes a backbone 310, a decoder 312 and a gaze estimation layer 314. The backbone 310 is a core of the neural network 302, responsible for feature extraction. It processes the input image to derive a set of features that represent the data. The decoder 312 aims to reconstruct the original image from the extracted features. This process allows the neural network 302 to learn representations that capture the essential characteristics of the input data. The gaze estimation layer 314 takes the feature representation and outputs a gaze estimation. It is trained with supervised learning, using labeled gaze data. During pre-training, a symmetry loss 350 is calculated based on the symmetry of the gaze estimation. The neural network 302 is pre-trained in step 202 based on an input image 304 and its horizontally flipped counterpart mirror image 306. The neural network 302 should predict symmetrical gaze directions and the symmetry loss 350 is defined accordingly. This loss helps the neural network 302 learn the natural symmetry present in gaze direction. The reconstruction loss 360 measures the difference between the original input image and its reconstructed version from the decoder 312. Minimizing this loss during pre-training step 202 encourages the neural network 302 to retain essential information during the encoding process, which provides for accurate reconstruction and, consequently, for effective gaze estimation.

During pre-training step 202, the neural network 302 is trained using labelled source data to minimize the supervised gaze loss. The unsupervised losses—symmetry loss and reconstruction loss—are also used to guide the neural network 302 toward learning features that are robust to transformations like image flipping and that maintain the integrity of the input image through the reconstruction process. As illustrated, the parameters of the neural network 302 for the backbone 310, the decoder 312 and the gaze estimation layer 314 are frozen for subsequent personalization steps 204 and 206 of the method 200. It can be seen from Equation 3 that the personalization could require optimizing all the parameters θ of network f, which might not be practical and challenging to execute on edge devices. Optimizing all parameters of the neural network 302 during the personalization phase could be computationally intensive, especially for edge devices with limited processing power and memory. This might make the application of such detailed personalization impractical for real-time or on-device applications. A potential solution to this problem is to fine-tune only a subset of the network's parameters. The systems and methods described herein propose a new meta-prompt-based approach that can reduce the computational load and memory requirements, making it more feasible for edge devices.

In step 204, a meta prompt is trained. After pre-training of step 204, a meta prompt is trained using meta-learning algorithms. This step involves tuning a small set of parameters (the prompt) instead of the whole model. The prompt serves as an auxiliary input to guide the model during the training process to better generalize to new tasks. The prompt is adapted to influence the network to produce features that can be used to obtain more faithful image reconstruction and lower left-right symmetry loss. The meta prompt aims to maximize the performance of the neural network 302 in terms of gaze estimation accuracy by minimizing the unsupervised loss function. In embodiments, described further herein, the meta prompt is an adaptive padding of the input feature maps in one or more layers of a convolutional neural network of the model. In this way, the parameters of the backbone 310 of the convolutional neural network 302 can be frozen in the pre-trained form from step 202 and only the parameters of the much smaller data sized meta prompt (adaptive padding) are trained during steps 204 and 206 to thereby increase processing efficiency of the personalization training process. The meta-prompt p is, in step 204, trained on a subset of the source data to be adaptable in general to the subsequent target domain personalization fine-tuning of step 206. A purpose of step 204 is to train the prompt in such a way that it can help the main model quickly adapt to new tasks or domains. This is done through meta-learning, which essentially trains the model on a range of tasks so it can learn the skill of learning.

In step 204, paddings of at least one convolutional layer of the backbone 310 are replaced with a tunable prompt. For example, the first n convolutional layers may be replaced with a tunable prompt. In examples, n is 2 or greater, 3 or greater, 4 or greater, 5 or greater and is 9 in an exemplary embodiment. It has been found that where the backbone 310 is a Resnet18 (which includes 18 convolutional layers), the personalization performance increases until the $13^{th}$ layer and should not extend to the $17^{th}$ layer to avoid performance degradation. Step 204 uses meta learning to train the paddings until a convergence condition has been reached.

Figure 4:
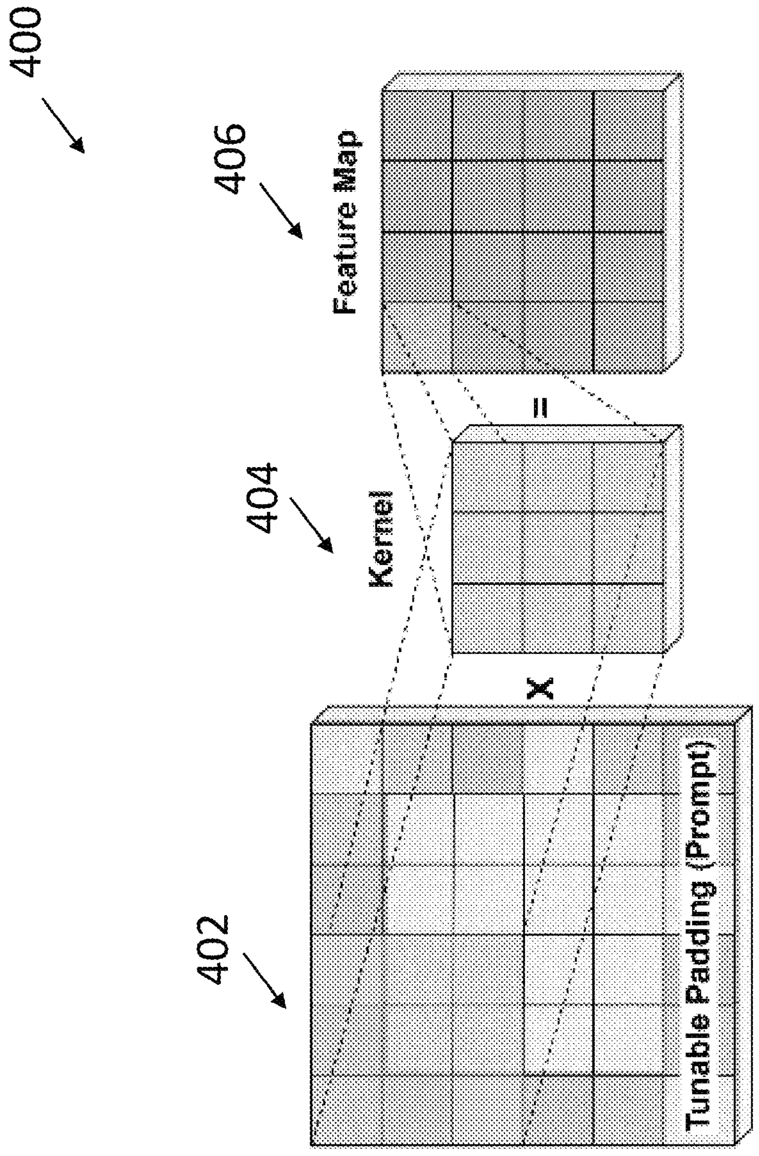
FIG. 4 is a graphical representation of the NN of FIG. 3 generating a feature map based on a prompt and a kernel, in accordance with at least some non-limiting embodiments of the present technology.

In convolutional layers, padding may be employed to maintain or control the size of the output feature maps, such as zero padding and reflect padding. Zero padding in the context of neural networks refers to the addition of zeros to the border of an image. When applied to the input of a convolutional layer, it allows the size of the output feature map to be controlled. It may be useful for ensuring that the spatial dimensions do not shrink too rapidly when successive convolutions are applied. Reflect padding, on the other hand, pads the image with a reflection of the image itself. Instead of padding with zeros, the border is created by mirroring the pixels on the edge of the image. This type of padding can help in creating more meaningful spatial information for the model to learn from, as the padded values are actual data points from the image, which can be particularly useful in tasks where the continuity of the image data is important. Referring to FIG. 4, a padded region 402 is convolved with the kernel 404 to produce the output feature map 406. This indicates that the padding change can impact the feature embedding of a CNN. In step 204, the padding is enabled to be updated so that it can help the neural network 302 to produce desired feature embeddings with respect to a specific person.

A meta prompt, in the context of padding operations for a convolutional neural network (CNN), refers to a higher-level instruction or input that guides the padding strategy used during the convolutional operations. Padding is a technique employed in CNNs to handle the borders of the input data when applying convolutional filters. In a typical convolutional layer, the size of the output feature map is determined by the size of the input feature map, the size of the convolutional kernel (filter), the stride (step size), and the padding. Padding is the addition of extra pixels or values around the input data, and it helps to ensure that the convolution operation can be applied to the border pixels without losing information.

A meta prompt for padding operations could be a parameter or input that specifies the type and amount of padding to be applied. Exemplary padding types according to embodiments of the present disclosure include:

- Valid (No Padding): No extra pixels are added, and the convolution is only applied to the input data where the filter and the input overlap completely. This may result in a smaller output size
- Same Padding: Padding is added so that the output feature map has the same spatial dimensions as the input feature map. It is achieved by adding zeros (zero-padding) around the input;
- Full Padding: Padding is added such that the convolution is applied to every possible position of the input data, even if it extends beyond the borders. This can result in a larger output size.

Other examples of adaptable padding can include:

- Size of the Padding: Adjusting how many rows or columns of padding are added around the input;
- Value of the Padding: Modifying the numerical values that the padding consists of (beyond just zero-padding);
- Type of the Padding: Changing from one padding strategy to another, such as from zero to reflect or replicate padding, which mirrors or repeats the edge values, respectively; and
- Distribution of the Padding: Altering whether padding is added symmetrically to all sides of the input or more to specific sides.

A meta prompt could specify one of these padding types or allow for a dynamic choice based on certain conditions. The meta prompt acts as a hyperparameter that determines the padding strategy. During the training of step 204, the model assesses the impact of different padding types (such as zero, reflect, or replicate padding) on the loss functions, which could be related to the accuracy of the network's output. The training involves using backpropagation and gradient descent to update the prompt parameters. The network learns to select or adjust the padding that leads to the best performance on the validation dataset. This adaptive padding process is part of the network's meta-learning strategy to enhance its capability to generalize from the training data to unseen data.

Figure 5:
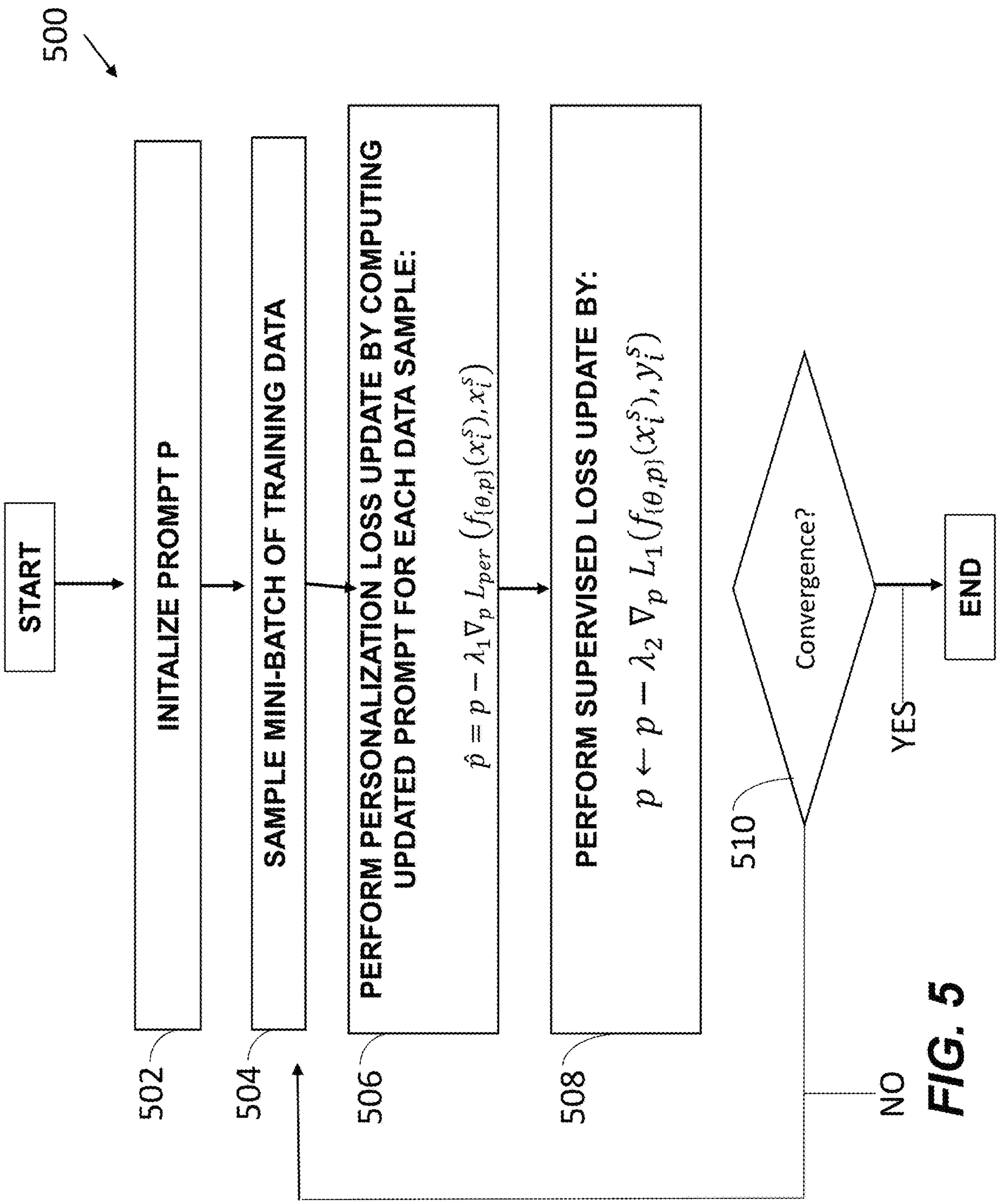
FIG. 5. is a scheme-block illustration of a method executed by a processor of the computing device of FIG. 1 for training a meta prompt, in accordance with at least some non-limiting embodiments of the present technology.

FIG. 5 provides an exemplary method 500 of training the meta prompt as sub-steps of step 204 of FIG. 2 and in accordance with embodiments of the present disclosure. Method 500 aims to fine-tune a pre-trained model to reduce gaze estimation errors using meta-learning on prompts rather than on the full neural network 302, which is more parameter-efficient. The prompts are randomly initialized and then updated through a mini-batch process using a personalization loss Lper. The meta-objective is to minimize the supervised loss with the optimization focused on the prompt p, not the entire network parameters. This targeted optimization allows for efficient updates that are aligned with the network's final task, potentially improving performance on gaze estimation while reducing computational overhead.

In step 502, the prompt p is randomly initialized. The pre-trained model $f_{\{\theta,p\}}$ from step 202 is provided with the tunable prompt equipped. The meta-training of the prompt of method 500 is conducted on the source dataset S. In step 504, a mini-batch of N paired data $$\{x_i^s, y_i^s\}_{i=1}^N$$

is sampled for the purpose of updating the randomly initialized prompt. In step 506, the prompt is updated for each of the N paired data of the sample using the personalization loss, as follows:

$$\hat{p} = p - \lambda_1 \nabla_p L_{per}(f_{\{\theta,p\}}(x_i^s), x_i^s) \qquad \text{(equation 6)}$$

where $\lambda_1$ is the learning rate. This update allows the prompt to guide the network in generating features that reduce the left-right symmetry loss and image reconstruction loss.

In Equation 6, the prompt p is being updated using a technique known as gradient descent. The gradient $\nabla_p$ $L_{per}$ $$(f_{\{\theta,p\}}(x_i^s), x_i^s)$$

is computed, which represents the direction of the steepest increase in the personalization loss Lper with respect to the prompt p. The gradient is then scaled by a learning rate λ1 which controls how large a step to take in the direction opposite to the gradient. The scaled gradient is subtracted from the current prompt p, which effectively moves the prompt towards minimizing the personalization loss. This update aims to adjust the prompt so that the network generates features that lead to a reduction in both the left-right symmetry loss and the image reconstruction loss, which are components of the personalization loss. This process is repeated iteratively for each data point in the mini-batch to improve the prompt's ability to personalize the model to new data.

In step 508, a supervised loss update is performed on the prompt p. A primary objective of the model is to minimize the gaze error through updates to the prompt p. Accordingly, the performance of the network is optimized by minimizing $L_1$. To this end, a meta-objective is defined as follows:

$$\arg\min_p L_1\big(f_{\{\theta,\hat{p}\}}(x_i^s), y_i^s\big) \qquad \text{(equation 7)}$$

Note that the supervised loss $L_1$ is computed based on the network's result $$f_{\{\theta,\hat{p}\}}(x_i^s),$$

which is based on the updated prompt p from step 506. The actual optimization of step 508 is carried out on the prompt p. The meta-objective can be implemented by the following gradient descent:

$$p \leftarrow p - \lambda_2 \nabla_p L_1\big(f_{\{\theta,\hat{p}\}}(x_i^s), y_i^s\big) \qquad \text{(equation 8)}$$

$\lambda_2$ being the learning rate.

Accordingly, step 508 refines the prompt to minimize gaze estimation errors. This is achieved by minimizing the supervised loss $L_1$, which assesses the accuracy of gaze predictions made by the neural network 302 (using the padding determined by the prompt p̂ according to step 506) against the true labels $$y_i^s.$$

The meta-objective is set to find the optimal prompt values that achieve the lowest supervised loss. Optimization is done using gradient descent, where the prompt p is iteratively adjusted by subtracting a product of the learning rate λ2 and the gradient of L1 with respect to p. This process fine-tunes the prompt to enhance the network's performance on gaze estimation tasks.

In step 510, convergence is assessed. Convergence may be assessed by evaluating the stability of the prompt's updates. During training, if the changes in the prompt p as a result of step 506 between iterations fall below a predetermined threshold, or if the performance improvement on a hold-out validation set plateaus, the prompt is considered to have converged. If convergence is not achieved, steps 504 to 506 are repeated unit convergence is achieved. The trained prompt p is output as a meta-initialized prompt for use in step 206 of FIG. 3. The prompt p from step 510 is integrated into the model's architecture (the architecture of the neural network 305 input and early layers (e.g. in the first 9 layers) of the CNN of the neural network 305) to influence how the model processes input data. The prompt p in the adapted model functions as a specialized set of parameters or a modular component that can be tuned independently of the rest of the model's parameters in order to achieve personalization. As such, step 510 (which is integrated in step 204 of FIG. 2) provides an adapted model $f_{\{\theta,p\}}$.

Referring back to FIG. 2, the method 200 proceeds to step 206 of adapting to a target domain using unsupervised loss with meta prompt. Target domain data $A_j$ is provided including a set of images or video frames capturing the gaze behavior of a specific user. These images show the user's eye movements and head positions under various conditions, like different lighting, angles, or backgrounds. This data allows the model to learn and adapt to the unique gaze patterns and environmental factors specific to that user. The data in $A_j$ is unlabeled and is used to fine-tune the prompt p in the model, so the model can better adapt to the unique user characteristics present in $A_j$.

The model uses the personalization loss $L_{per}$ to adapt the prompt p specifically for the target domain data $A_j$, which consists of test images. The prompt p is fine-tuned to minimize personalization loss, based on how the adapted model $f_{\{\theta,p\}}$ performs on $A_j$. This process involves adjusting only the prompt, not the entire model. The updated prompt allows the network to better fit the specific characteristics of the person's data in the target domain. This is crucial for gaze estimation, where individual variations can significantly impact accuracy. The prompt is updated iteratively until it converges, meaning further adjustments yield negligible improvements in the personalization loss.

Step 206 performs the adaptation to the target domain based on the following equation:

$$p_j = \arg\min_p L_{per}(f_{\{\theta,p\}}(A_j), A_j) \qquad \text{(equation 8)}$$

Equation 8 describes the process of optimizing the prompt p to minimize the personalization loss $L_{per}$ on the target domain data $A_j$. As described previously, the personalization loss includes a reconstruction loss that measures how well the adapted model can reconstruct the personalized input data. The personalization loss includes a symmetry loss that evaluates the consistency of the model's output on an image and its transformed version (e.g., horizontally flipped).

Referring to FIG. 3, a first image 304

$$(x_i^{a_j})$$

taken from the target domain is shown along with its rotationally transformed version $$T(x_i^{a_j})$$

in the form of mirror image 306. The neural network 302 generates first and second reconstructed images 324, 326 for both the first image 304 and the mirror image 306. The reconstruction loss 360 is determined based on a comparison between the first reconstruction image 324 and the first image 304 and a comparison between the second reconstruction image 326 and the mirror image 306. The symmetry loss 350 is determined based on a comparison between a first gaze angle generated by the neural network 302 for the first image 304 and a second gaze angle (after transformation) generated by the neural network 302 based on the mirror image 306. In step 206 of FIG. 2, the prompt p is fine tuned based on the symmetry loss 350 and the reconstruction loss 360. As can be seen in FIG. 3, during the adaptation to the target domain of step 206, the parameters of the backbone 310 are frozen, the parameters of the decoder 312 are frozen and the parameters of the gaze estimation layer 314 are frozen. It is only the prompt p that is adapted. The prompt p determines padding 305 applied to the first image 304 and the padding 307 applied to the mirror image 306. The prompt p further determines padding applied to n first layers of the convolutional layers of the backbone 310.

The trained and personalized model provided by the systems and methods described herein may be stored on memory of a device of the user, or stored on memory of a server that can be accessed by the device. Applications of the user device may feed images to the model to receive and accurate gaze prediction. Exemplary software applications include:

- Assistive Technology: Helping individuals with disabilities interact with computers using eye movements.
- User Experience Research: Analyzing where users look on a screen or in a physical environment to improve product design and marketing strategies.
- Automotive: Monitoring drivers' gaze for signs of distraction or drowsiness to enhance road safety.
- Gaming and VR: Creating more immersive and interactive gaming experiences by integrating gaze tracking.
- Psychology and Neuroscience: Studying attention, cognition, and social interaction through eye movement analysis.
- Retail: Understanding customer behavior and preferences by tracking gaze in stores.
- Medical Diagnostics: Assisting in diagnosing conditions like autism or concussions based on eye movement patterns.

The methods and systems described herein allow computing devices, such as edge devices, to achieve personalized gaze estimation, without the need to collect ground truth labels, which may affect user experience. The described pipeline requires less parameters to be updated during personalization, which can save computational resources. The method can be run at backend. Model performance can be continuously improved without disturbing users (like calibration). The framework uses meta learning that can effectively guarantee the minimizing of unsupervised loss is related to reduce gaze error. Computation resources like memory and processing requirements can be conserved due to the personalization update being applied to only some parameters of the model during training, thereby providing a method that directly reduces memory requirements for training the model.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for gaze prediction, the method comprising:

generating a mirror image from a given image, the given image obtained from a database of training images;

generating, by a neural network, a first gaze prediction based on the given image and a mirror gaze prediction based on the mirror image;

generating a symmetry loss value based on a comparison between the first gaze prediction and the mirror gaze prediction;

generating, by the neural network, a reconstructed image based on at least one of the given image and the mirror image;

generating a reconstruction loss value based on a comparison between the reconstructed image and the at least one of the given image and the mirror image;

updating at least some parameters of the neural network based on a combination of the symmetry loss value and the reconstruction loss value, wherein updating at least some parameters of the neural network comprises updating a meta prompt that determines characteristics of padding applied to the given image and the mirror image;

using the updated neural network to provide a further gaze prediction based on a further image, the further image obtained from a user device; and outputting the further gaze prediction to an application utilizing the further gaze prediction.

2. The method of claim 1, wherein the neural network comprises a convolutional neural network.

3. The method of claim 1, wherein the neural network comprises a backbone providing backbone output to a decoder for generating reconstructed images and to a gaze estimation layer for providing gaze predictions.

4. The method of claim 1, wherein the neural network is a convolutional neural network comprising m layers and the updating at least some parameters of the neural network comprises updating the meta prompt that determines characteristics of padding applied to a first n output feature maps from a preceding layer of the m layers of the convolution neural network, wherein n is greater than 2 and less than m.

5. The method of claim 3, wherein in updating at least some parameters of the neural network comprises freezing pre-trained parameters of the backbone, the decoder and the gaze estimation layer.

6. A system comprising:

at least one processor; and a memory storing computer program instructions executable by the at least one processor such that the system is configured to:

generate a mirror image from a given image, the given image obtained from a database of training images;

generate, by a neural network, a first gaze prediction based on the given image and a mirror gaze prediction based on the mirror image;

generate a symmetry loss value based on a comparison between the first gaze prediction and the mirror gaze prediction;

generate, by the neural network, a reconstructed image based on at least one of the given image and the mirror image;

generate a reconstruction loss value based on a comparison between the reconstructed image and the at least one of the given image and the mirror image;

update at least some parameters of the neural network based on a combination of the symmetry loss value and the reconstruction loss value, wherein updating at least some parameters of the neural network comprises updating a meta prompt that determines characteristics of padding applied to the given image and the mirror image;

use the updated neural network to provide a further gaze prediction based on a further image, the further image obtained from a user device; and output the further gaze prediction to an application that is executable by the at least one processor and that utilizes the further gaze prediction.

7. The system of claim 6, wherein the neural network comprises a convolutional neural network.

8. The system of claim 6, wherein the neural network comprises a backbone providing backbone output to a decoder for generating reconstructed images and to a gaze estimation layer for providing gaze predictions.

9. The system of claim 6, wherein the neural network is a convolutional neural network comprising m layers and the updating at least some parameters of the neural network comprises updating the meta prompt that determines characteristics of padding applied to a first n output feature maps from a preceding layer of the m layers of the convolution neural network, wherein n is greater than 2 and less than m.

10. The system of claim 8, wherein in updating at least some parameters of the neural network comprises freezing pre-trained parameters of the backbone, the decoder and the gaze estimation layer.

* * * * *